Aug. 24, 1948.   C. E. WILLOUS   2,447,884
MATERIAL WORKING APPARATUS
Filed April 9, 1946   3 Sheets-Sheet 1

INVENTOR
C.E. WILLOUS
BY
W.C. Parnell
ATTORNEY

Aug. 24, 1948.  C. E. WILLOUS  2,447,884
MATERIAL WORKING APPARATUS
Filed April 9, 1946  3 Sheets-Sheet 2

INVENTOR
C.E. WILLOUS
BY
W.C. Parnell
ATTORNEY

Patented Aug. 24, 1948

2,447,884

UNITED STATES PATENT OFFICE 2,447,884

MATERIAL WORKING APPARATUS

Charles E. Willous, West Orange, N. J., assignor to Western Electric Company, Incorporated, New York, N. Y., a corporation of New York Application April 9, 1946, Serial No. 660,687

7 Claims. (Cl. 164—59)

This invention relates to material working apparatus, and more particularly to material stops in punch and die structures.

In numerous punch and die structures where articles are formed by successive operations on the same portions of material as the material is fed through the machine, it is common practice to perform the several operations simultaneously on different portions of the material so that an article is completed for each stroke of the tool holder. While this method is efficient from an operating standpoint, it usually involves the wasting of the links at the leading ends of material when conventional material stops are employed.

An object of this invention is to provide auxiliary stop means necessary in material working apparatus to minimize the loss of material during the initial forming operations.

In the present embodiment of the invention, the material working apparatus includes companion tools such as punches and dies for partially forming articles in a sheet material which is advanced intermittently and another sheet of tools including shearing elements to shear lengths from the material to complete the articles formed therefrom. If only the standard or conventional stop should be utilized, material of the length of two articles would be wasted before a complete article could be formed by the apparatus. To eliminate the loss of this material, an auxiliary stop is moved in the path of the material to stop the material for the first forming operation allowing an additional portion at the salvage or leading end to be trimmed for the first article. Another auxiliary stop is actuable relative to the material to locate the material for the second forming operation and the first shearing operation where the salvage leading end of the material is sheared from the material in continuing to form the first article. Subsequent to the use of the auxiliary stops, the succeeding steps utilize the stationary stop, and after the third movement of the material, the first article is formed thereby producing from the material in the present instance two more articles than could have been produced from the same material without the use of the auxiliary stops.

Other objects and advantages will be apparent from the following detailed description when considered in conjunction with the accompanying drawings, wherein Fig. 1 is a top plan view of the apparatus with the upper tools and support removed;

Fig. 5 is a schematic illustration of the use of the auxiliary stop for the first position, and Fig. 6 is a schematic illustration of the use of the auxiliary stop for the second position.

Figure 1:
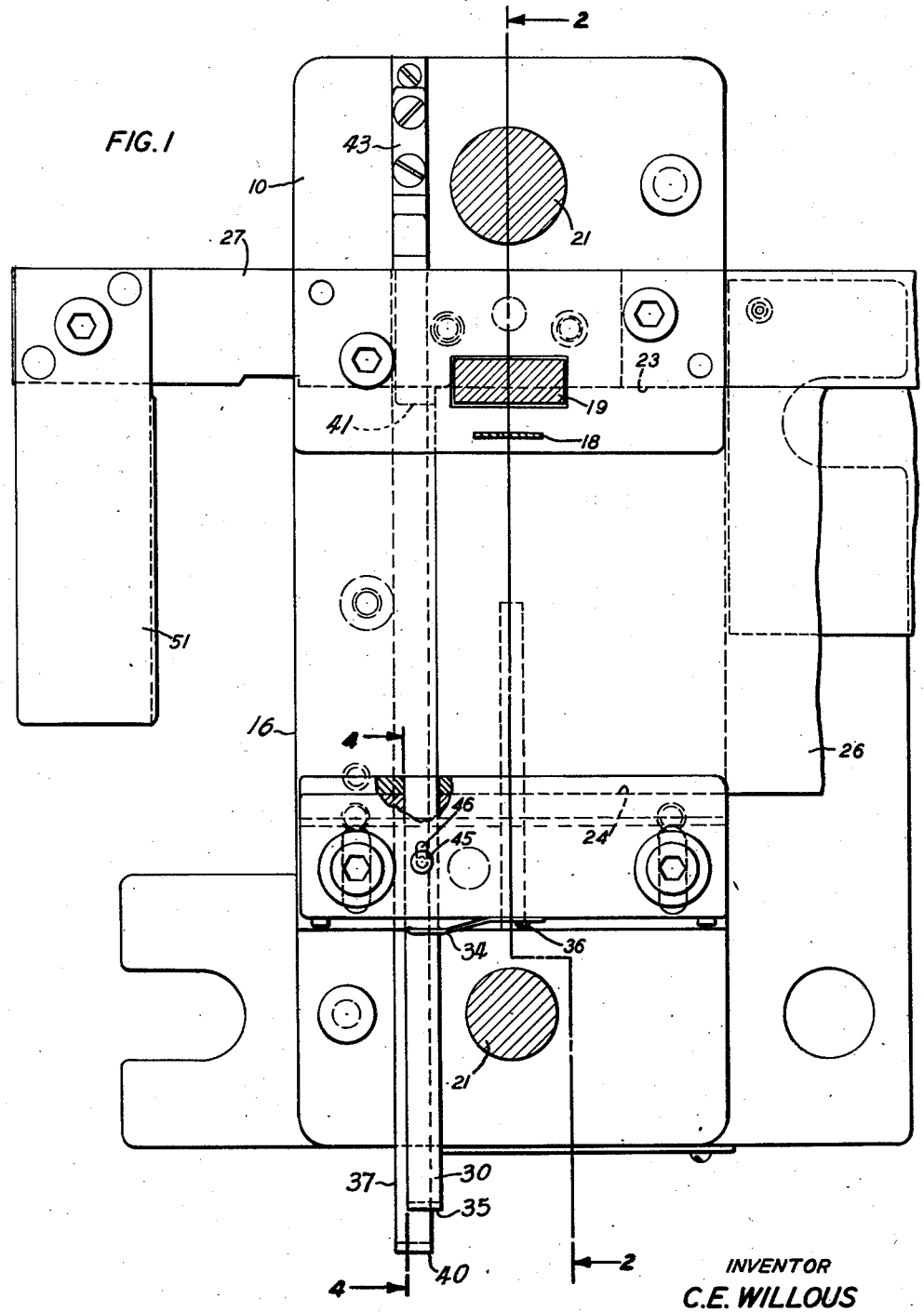

Referring now to the drawings, the apparatus selected to illustrate the invention includes a base plate 10 having the usual apertures 11 for forming dies 14 and 15, the latter being mounted upon the mounting plate. In addition to the dies 14 and 15, a shearing block 16 is mounted on the mounting plate for use in cooperation with a shearing element or tool 17. The tool 17 is mounted with punches 18 and 19 on a head 20 in their respective positions. The head 20 is guided in the conventional manner by rods 21 and is reciprocated through operating cycles by any suitable means (not shown) connected to a shank 22 of the head 20. Suitable guides 23 and 24 are mounted upon the plate 10 a given distance apart, depending upon the width of sheet material 26 out of which articles are to be formed. A stationary stop 51 mounted upon a supporting arm 27 is positioned to be engaged by the leading end of the material to locate the material for all operations subsequent to the second operation in the present instance. If there should be more than two groups of operations required for forming the articles, then the necessary number of additional auxiliary stops would be employed for the first of each of these operations. In the present embodiment, two auxiliary stops are provided for the two groups of required operations.

Figure 2:
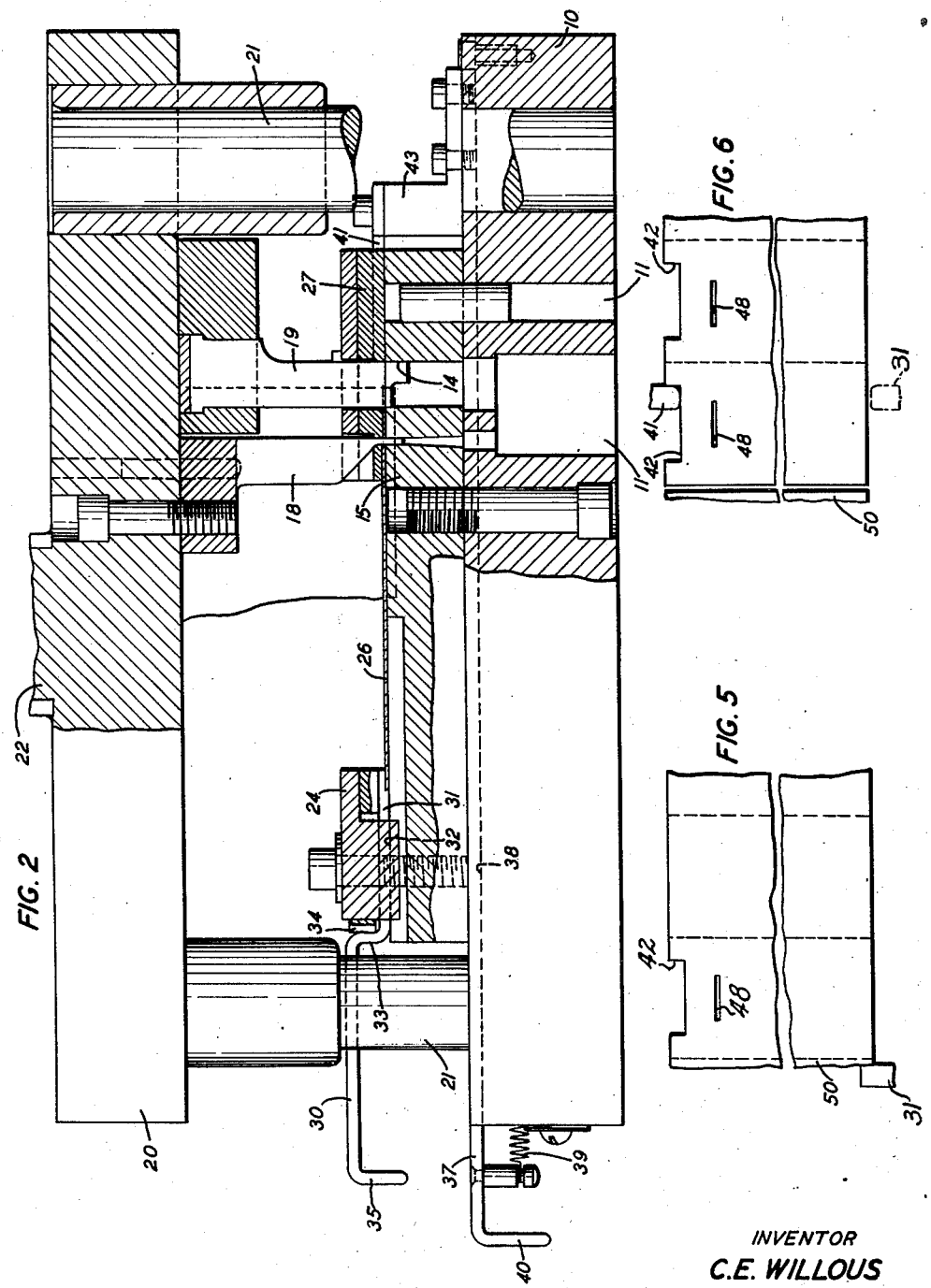
Fig. 2 is a vertical sectional view taken substantially along the line 2—2 of Fig. 1.
Figure 3:
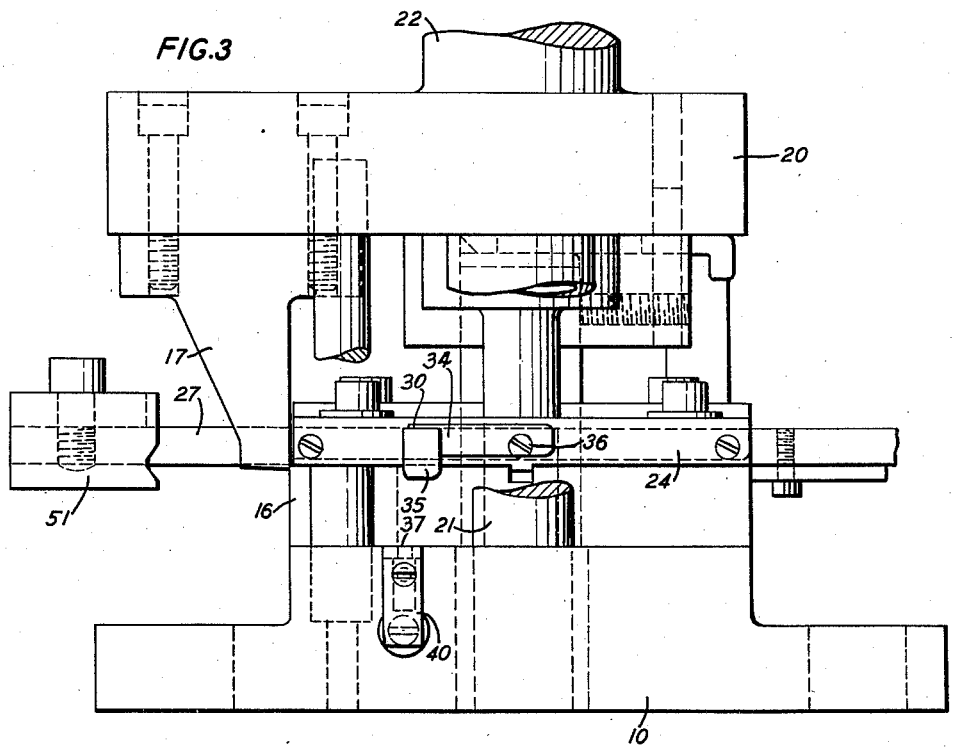
Fig. 3 is a front elevational view of the apparatus, portions thereof being broken away.
Figure 4:
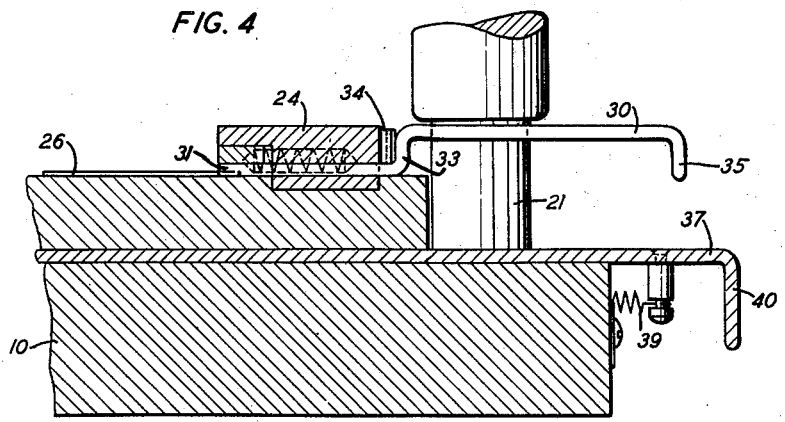
Fig. 4 is an enlarged sectional view taken along the line 4—4 of Fig. 1.

The first auxiliary stop includes an arm 30 of the general contour shown in Fig. 2 with a portion 31 slidable in a suitable aperture 32 of the guide 24 so that the inner portion or end thereof may be moved into the path of the material 26. An upwardly bent or vertical portion 33 of the auxiliary stop 30 provides a shoulder for the engagement of a spring 34 fixed at 36 to the guide 24 to hold the stop normally out of the path of the material. A downwardly bent portion 35 provides a handle for use in moving the stop and holding it in the path of the material.

The second auxiliary stop 37 is slidable in a groove 38 in the mounting plate 10 and is normally urged to the right (Fig. 2) by a spring 39. A handle portion 40 similar to the handle portion 35 of the stop 30 is utilized in moving the stop to the left to cause a projection 41 to enter a notch 42 formed in the material by the punch 19 and its die 14 during the first forming operation. The projection 41 is mounted upon a bracket 43, the bracket being mounted upon the rearmost end of the stop 37.

During the operation of the apparatus when the new sheet of material 26 is being fed to the apparatus, the operator presses the auxiliary stop 30 inwardly to move the inner end thereof in the path of the material limited by a pin 45 carried by the stop 30 and extending through an elongate aperture 46 in the guide 24. The material is stopped by the auxiliary stop to position a desired length of the material beneath the tools 18 and 19 for the first operation. During this operation an opening 48 and the notch 42 are formed in the material. As illustrated in Fig. 5, an additional length of the material indicated at 50 is added to that required for the first article so that it may be trimmed during the next operation of the apparatus. After the completion of the first operation, the auxiliary stop 30 is allowed to return to its normal position and the auxiliary stop 37 is pulled outwardly after the material has been advanced to allow the projection 41 to rest in the corner of the notch 42 as illustrated in Fig. 6. At this time, the material is accurately located for the second operation which includes the forming of the second notch 42 and opening 48 in addition to the first shearing operation which shears the excess material 50 from the leading end of the material 51. The next group of operations may be performed by the use of the stop 51 until the whole length of material has been used, after which the same auxiliary steps are performed through the aid of the auxiliary stops to eliminate the loss of the material for the first two operations on the next length of material and also to utilize these operations in the forming of satisfactory articles.

During the use of material working apparatus of this type the dies must be reconditioned occasionally when they become dull by continued use. At such times the upper surfaces of the dies and also the work support are ground down a given distance. The auxiliary stop 30 being mounted to slide on the work support may be removed during this grinding operation and when repositioned on the work support it will be in a plane with the work. Regarding the auxiliary stop 37—41 the projection 41 may be removed from the bracket 43 so that during the grinding operation the upper surface of the bracket may be ground to keep it in the plane of the work supporting surface and the upper surfaces of the dies. When the projection 41 is again mounted on the bracket 43 it will lie in a plane with the work.

Although specific improvements of the invention have been shown and described, it will be understood that they are but illustrative and that various modifications may be made therein without departing from the scope and spirit of this invention as defined by the appended claims.

What is claimed is:

1. In an apparatus having tools for performing work on material fed intermittently to successive positions in a given path relative thereto, and a stationary stop to locate the material relative to the tools subsequent to the first operation, an auxiliary stop supported for movement transversely of the path of the material, and means by the aid of which the auxiliary stop may be moved to stop the material short of the stationary stop for the first operation by the tools on the material.

2. In an apparatus having spaced tools for performing operations on material fed intermittently to successive positions in a given path thereto, and a stationary stop to locate the material relative to the tools subsequent to a number of operations of the tools on the material, movable stops supported for movement transversely of the path of the material, means by the aid of which one of the auxiliary stops may be moved to stop the material for the initial operation, and means by the aid of which another of the auxiliary stops may be moved to stop the material for the second operation prior to the material reaching the stationary stop.

3. In an apparatus having a tool to shear portions of given lengths from a material fed intermittently in a given path relative thereto, and a stationary stop to locate the material relative to the tool subsequent to the first shearing operation, an auxiliary stop supported for movement transversely of the path of the material, and means for use in moving the auxiliary stop to stop the material short of the stationary stop for trimming the leading end of the material by the tool.

4. In an apparatus having a forming tool and a shearing tool movable to successively form portions of a material, advanced intermittently in a given path, and to shear the portions from the material, and a stationary stop to locate the material relative to the tools subsequent to the first number of operations, an auxiliary stop movable to stop the material short of the shearing tool for the first forming operation by the forming tool, and another auxiliary stop movable to locate the material short of the stationary stop for the first shearing operation by the shearing tool and for the second forming operation.

5. In an apparatus having a forming tool and a shearing tool movable to successively form portions of a material, advanced intermittently in a given path, and to shear the portions from the material, and a stationary stop to locate the material relative to the tools subsequent to the first number of operations, an auxiliary stop mounted for movement transversely of the path of the material, means for use in moving the auxiliary stop to locate a portion of a slightly greater length than that required for the first forming operation beneath the forming tool, another auxiliary stop mounted for movement transversely of the path of the material, and means for use in moving the second auxiliary stop to locate the material for the second forming operation to trim the excess portion from the leading end of the material.

6. In an apparatus having tools for performing work on material fed intermittently to successive positions in a given path relative thereto, and a stationary stop to locate the material relative to the tools subsequent to the first operation, an auxiliary stop supported for movement transversely of the path of the material, means by the aid of which the auxiliary stop may be moved to stop the material short of the stationary stop for the first operation by the tools on the material, and means to normally hold the auxiliary stop out of the path of the material.

7. In an apparatus having a forming tool and a shearing tool movable to successively form portions of a material, advanced intermittently in a given path, and to shear the portions from the material, and a stationary stop to locate the material relative to the tools subsequent to the first number of operations, an auxiliary stop mounted for movement transversely of the path of the material, means for use in moving the auxiliary stop to locate a portion of a slightly greater length than that required for the first forming operation beneath the forming tool, another auxiliary stop mounted for movement transversely of the path of the material, means for use in moving the second auxiliary stop to locate the material for the second forming operation and for the first shearing operation to trim the excess portion from the leading end of the material, and separate means to normally urge the auxiliary stops out of the path of the material.

CHARLES E. WILLOUS.